Feb. 2, 1960 R. DALLEMAGNE 2,923,778
SIGNALLING DEVICE FOR DOUBLE SIDEBAND CARRIER
CURRENT TELEPHONE SYSTEMS
Filed Jan. 28, 1958

United States Patent Office 2,923,778

Patented Feb. 2, 1960

2,923,778

SIGNALLING DEVICE FOR DOUBLE SIDEBAND CARRIER CURRENT TELEPHONE SYSTEMS

Robert Dallemagne, Conflans Ste.-Honorine, Seine-et-Oise, France, assignor to Lignes Telegraphiques & Telephoniques, Paris, France Application January 28, 1958, Serial No. 711,632

Claims priority, application France March 21, 1957

4 Claims. (Cl. 179—84)

Figure 1:
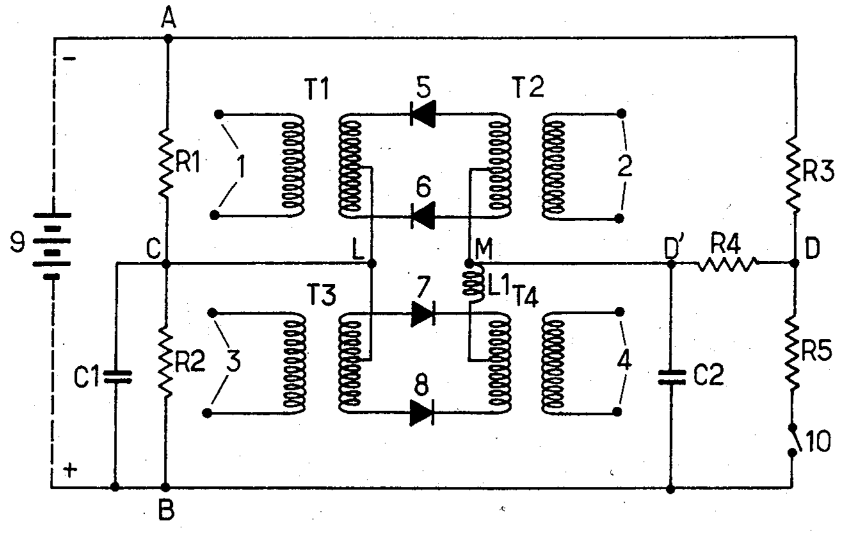

The present invention relates to devices for the alternate transmission of speech and "signalling" currents in double sideband amplitude-modulated carrier current telephone systems. The term "signalling" is intended to include the transmission of ringing and dialing signals and the like which are distinguished from speech signals.

More specifically, the invention relates to such systems in which, at their transmitting end, carrier wave modulation is effected by means of a balanced modulator such as ring modulator; i.e. by means of a modulator which normally does not transmit a carrier wave from its output terminals and in which said carrier wave is added at said output terminals to the sidebands produced by the telephone signals fed to the input terminals of said modulator.

According to a well-known method, signalling may be effected in such systems by applying a voice frequency signal to the input of the modulator, the addition of the carrier wave at its output being omitted. At the receiving end of the system, signalling is obtained by mutual interference in a demodulator of the sidebands of the voice frequency modulated wave. This modulator then delivers, at its output, signalling currents having a frequency twice said voice frequency and therefore easily extracted from the speech signals.

Thus, to transmit speech and signalling signals alternately in such a system, there must be provided a device capable of alternately transmitting, under the influence of a control voltage at one of two fixed values, said carrier wave to the output of said modulator or said voice frequency signal to its input. This control voltage may, for instance, alternately take a positive or a negative D.C. value, its passing from one to the other of said values being effected by the opening or the closing of a contact actuated by an electromagnetic relay itself operated by D.C. currents from a subscriber's line or from a telephone exchange.

An object of the present invention is to provide an improved device which, during the transmission of speech signals, allows the passing of the carrier wave and stops the voice frequency signalling signal; conversely, during the transmission of speech signals, it stops the carrier wave and allows the passing of the voice frequency signalling signal towards the input of the channel modulator.

In accordance with one embodiment of the invention, a device comprising two rectifier groups, the first of which is hereinafter referred to as the signalling current rectifier group and is submitted to the action of control means giving the voice frequency signalling current path a very high attenuation during transmission of speech currents, but reducing said attenuation to a practically zero value during transmission of said signalling currents; the second of which, hereinafter called "carrier current rectifier group," is also submitted to the action of said control means but, on the contrary, allows the passing of the carrier current during transmission of speech currents and stops it during transmission of said signalling currents. The control means for both of these rectifier groups consists of a D.C. voltage received across one of the diagonals of a Wheatstone bridge, which contains in its other diagonal a source of D.C. voltage. A contact actuated by a signalling relay or any other device for the purpose is located in one of the arms of said bridge and, according to its closed or opened condition, reverses the D.C. voltage polarity between the terminals of said one of said diagonals.

Devices according to the invention are further characterized by the following features:

(1) During the transmission of speech currents, the bridge is balanced, by means of condensers, for voltages the frequencies of which are located in the frequency band of said speech currents. This reduces parasitic currents in the frequency which may possibly originate from said D.C. source.

(2) An inductance is connected in series with the control voltage feeding both of the rectifier groups. This reduces noise possibly induced in the case of a multiple channel system, by the keying of the carrier current in other channels than the considered one, particularly in the case where automatic signalling is used.

(3) The first rectifier group further includes resistances having a symmetrical arrangement for its current passing condition, and an asymmetrical arrangement in its non-passing condition. This provides a high attenuation for the voice frequency signalling current during transmission of speech, even if the rectifiers have very different resistances when biassed in an opposite direction to that of their normal conductivity.

Figure 2:
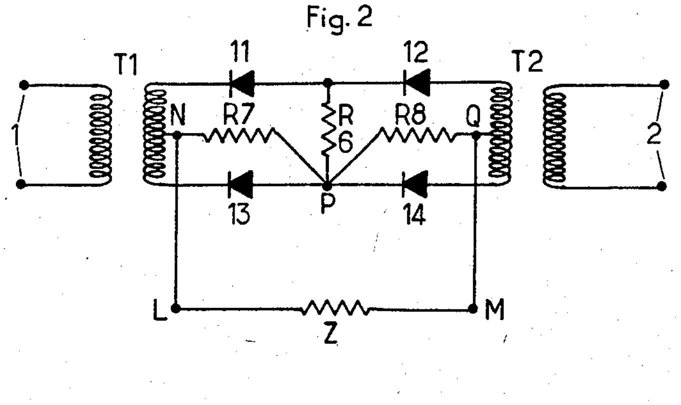

The invention and its objects and advantages will be better understood from the following detailed description given with reference to the annexed drawing, which illustrates different embodiments of the invention and in which:

Figure 1 shows a device in accordance with one embodiment of the invention, the device including two "blocking devices" each comprising one rectifier group and a control means; and Figure 2 represents one of said blocking devices, with an arrangement slightly differing from that of Figure 1.

The assembly represented in Figure 1 consists of two blocking devices, the first of which includes pairs of input and output terminals 1 and 2, respectively, and the second of which includes input terminals 3 and output terminals 4. An alternating signalling current of frequency $f_0$, for instance 3000 c./s., is applied to the input terminals 1 (the transmitted frequency band for speech being assumed to be approximately 300 to 3,400 c./s.). Terminals 2 are connected to the input of a channel modulator (not shown). This blocking device consists of two rectifiers 5 and 6 and two transformers $T_1$ and $T_2$.

The said blocking device is fed at points L and M hereafter called "control terminals," with voltage received across one of the diagonals C, D of a resistance or Wheatstone bridge whose extremities are A, B, C and D and the other diagonal A, B of which is connected to a D.C. voltage source 9.

A signalling relay or any other equivalent device enables by the opening or closing of a contact 10, the reversing of the D.C. voltage polarity between points C and D, which puts rectifier pairs 5 and 6 and 7 and 8 alternately in their current passing or blocking condition according to the positive or negative character of said polarity.

During speech transmission, contact 10 is open and the potential of C is higher than that of D; rectifiers 5 and 6 become non-conducting and highly attenuate the alternating signalling current, the passing of which from terminals 1 to 2 is thus prevented; the second rectifier pair 7 and 8 is, however, in current passing condition and the carrier current applied at 3 is transmitted from terminals 3 to 4, and thus towards the channel modulator (not shown).

During transmission of signalling currents, contact 10 is closed. The value of resistance $R_5$ is low compared with those of the other resistances, $R_1$, $R_2$ and $R_3$ of the bridge arms, and thus the potential of D is higher than that of C. The first rectifier pair 5 and 6 is rendered conductive and the alternating signalling current is transmitted from terminals 1 to 2 while the second rectifier pair 7 and 8 is made non-conducting and prevents transmission of carrier current from terminals 3 to 4.

In source 9, noise voltages can possibly be generated in addition to the D.C. voltage. Noise voltages will modify the instantaneous voltage at the terminals of source 9 in an undesirable manner. If voltage fluctuations appear between C and D during the transmission of speech currents when contact 10 is open, they modify the instantaneous values of the current traversing rectifiers 7 and 8 and consequently the dynamic resistance of the latter, which are connected in series in the blocking circuit for the carrier current. Undesirable amplitude modulation of the transmitted carrier current may result therefrom and appear as noise added to the speech signals. In order to avoid this drawback, condensers $C_1$ and $C_2$ are connected across $R_2$ and between points M and B, respectively, and a resistance $R_4$ is added between D and M so as to constitute with resistances $R_1$, $R_2$ and $(R_3+R_4)$ a balanced bridge for the frequencies of speech currents. The capacitance values of these condensers must be such that $$R_1C_1=(R_3+R_4)C_2$$

subject to the condition that the resistance value $R_2$ be much greater than that of the reactance of condenser $C_1$ in the whole of the useful frequency band of the transmitted speech currents.

In the case of automatic signalling, the keying of the carrier current by the switching devices causes strong transients with parasitic frequencies covering a very wide spectrum, which can cause disturbances in communication channels located in the vicinity of the channel under consideration, this is especially true if, for economic reasons, no channel filter is used at the transmitting end of the double sideband system of the disclosed class. In order to reduce these disturbances, an inductance $L_1$ is connected in series at M in the control circuit of the rectifier pair 7 and 8 which, in its conducting condition, insures the passing of the carrier current. Together with condensers $C_1$ and $C_2$, inductance $L_1$ constitutes a filtering network such that frequences which are outside the range $f_0$ from the channel carrier current frequency are sufficiently attenuated to reduce the disturbances in other channels to a very low level without using special channel filters.

Another difficulty is encountered in practice in obtaining sufficient attenuation of the voltage of frequency $f_0$ during the transmission of speech currents since the latter frequency is comprised in the frequency band of said speech currents. In fact, due to the comparatively low value of the inverse resistance of rectifiers 5 and 6, which does not exceed a few megohms, the attenuation of the first blocking device is generally not high enough to eliminate satisfactorily noise transmitted to other channels by the signalling current in one channel during the transmission of speech currents in said other channels.

To avoid this drawback, the first blocking device may be built as shown in Figure 2, where Z represents the impedance of the whole control voltage circuit of a signalling current blocking device as seen from terminals L and M. The four rectifiers 11, 12, 13 and 14, together with resistance $R_6$ and transformers $T_1$ and $T_2$ constitute a double blocking device. When this double blocking device is considered without the resistances $R_7$ and $R_8$, calculation and experiment show that, due to the fact that the value of impedance Z is low and that the inverse resistances of the rectifiers of each pair may be slightly unbalanced, the attenuation value of the four-rectifier assembly of Figure 2 in its non-passing condition is not much higher than that of the simpler device of Figure 1. On the other hand, an accurate balance of the inverse rectifier resistances is practically impossible. Therefore, to obtain adequate attenuation, practically independently of the lack of balance of the rectifiers, a resistance $R_7$ is located between the center tap N of the secondary winding of transformer $T_1$ and the junction point P of resistance $R_6$ with rectifiers 13 and 14, and a resistance $R_8$ is located between point P and the center tap Q of the primary winding of transformer $T_2$. If $R_d$ and $R_i$ are respectively the direct and inverse resistances of a rectifier, the value of each of the resistances $R_7$ and $R_8$ is substantially equal to the geometrical mean of $R_d$ and $R_i$; practically, it is of the order of magnitude of 10,000 ohms.

During the passing conditions of the rectifiers the values of $R_7$ and $R_8$ are high in comparison with the dynamic resistances of the rectifiers, which resistances may be about 10 ohms; their action is therefore negligible and the arrangement can be considered as a symmetrical one constituted by rectifiers 11, 12, 13 and 14 and resistance $R_6$. This arrangement allows balancing of the direct currents which pass in the two halves of the secondary winding of the transformer $T_1$ and in the two halves of the primary winding of transformer $T_2$, thus avoiding saturation of the magnetic cores of these transformers. Adjustment of resistance $R_6$ can be used to set the attenuation of the device for the alternating signalling frequency current $f_0$ to a desired value.

During the non-passing conditions of the rectifiers, the blocking device of Figure 2 may be considered as an asymmetrical structure consisting of rectifiers 11 and 12 and resistance $R_6$. Its attenuation may be very high without using rectifiers balanced in pairs. Furthermore, the required tolerance for the values of resistances $R_7$ and $R_8$ may be rather wide (within ten to twenty percent) without any disturbance resulting therefrom.

It would be also possible to use a device in which resistances $R_7$ and $R_8$ are connected to the middle point of $R_6$ and not to one of its ends; this would also make the use of balanced rectifiers unnecessary, but would have the disadvantages of requiring more accurate and a larger number of resistances and of making it more difficult to adjust the attenuation of the device in its passing condition.

What I claim is:

1. In a carrier current telephone system, a signalling device for alternately transmitting a carrier current and a voice frequency signal respectively to first and second pairs of output terminals, comprising a first blocking device including at least one pair of rectifiers, a second blocking device including at least one further pair of rectifiers, means for applying said voice frequency signal to said first blocking device, means for applying said carrier current to said second blocking device, control terminals for controlling said blocking devices from a direct-current source, an unbalanced Wheatstone bridge including first, second, third and fourth resistance arms and diagonals coupling said arms, said fourth arm including a contact in series with its resistance, first circuit means for connecting said direct-current source across one diagonal of said bridge, second circuit means for applying direct-current voltage received across the other diagonal of said bridge to said control terminals, and third circuit means for applying voltage received at said control terminals to bias the rectifiers of both of said blocking devices with respective polarities such that the rectifiers of one of said blocking devices are in non-conducting condition, when the rectifiers of the other of said blocking devices are in conducting condition.

2. A device as claimed in claim 1, wherein said source includes first and second terminals and said first arm of said bridge consists of resistance of value $R_2$ connected to said first terminal of said source in parallel connection with a condenser of capacitance value $C_1$, said fourth arm of said bridge being connected to said first terminal of said source and consisting of the series assembly of said contact and of a first resistance in parallel connection with the assembly of a second resistance of value $R_4$ in series with a condenser of capacitance value $C_2$ connected to said first terminal of said source, said second terminal of said source being connected to the common point of latter said first and second resistances through said third arm which consists of a resistance of value $R_3$, said second terminal of said source being also connected to said second arm which consists of a resistance of value $R_1$, said values $C_1$, $C_2$, $R_1$, $R_3$ and $R_4$ being related by the relationship:

$$R_1C_1=(R_3+R_4)C_2$$

said control terminals being respectively connected to the common point of said first and second arms and to the common point of said condenser $C_2$ and resistance $R_4$.

3. A device as claimed in claim 1, wherein said third circuit means includes a series inductance inserted between one of said control terminals and said second blocking device.

4. A device as claimed in claim 1, wherein at least one of said blocking devices includes two pairs of rectifiers each consisting of two rectifiers in series connection, and comprising three further resistances respectively connecting the common point of the rectifiers of one of latter said pairs to the common point of the rectifiers of the other of the latter said pairs and to each of said control terminals.

References Cited in the file of this patent

UNITED STATES PATENTS 2,733,299 Staples ---------------- Jan. 31, 1956